(12) United States Patent
Madar et al.

(10) Patent No.: US 7,765,423 B2
(45) Date of Patent: Jul. 27, 2010

(54) IMPLEMENTATION OF MULTIPLE CLOCK INTERFACES

(75) Inventors: Piero Andreas Madar, Indianapolis, IN (US); Sean Phillip Conrad, Fishers, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 639 days.

(21) Appl. No.: 11/643,334

(22) Filed: Dec. 21, 2006

(65) Prior Publication Data
US 2008/0155297 A1 Jun. 26, 2008

(51) Int. Cl.
*G06F 1/14* (2006.01)
*G06F 21/22* (2006.01)
(52) U.S. Cl. .............................. 713/502; 705/51; 705/59
(58) Field of Classification Search ...................... 713/1, 713/2, 187, 502; 726/30; 705/50, 59
See application file for complete search history.

(56) References Cited

U.S. PATENT DOCUMENTS

| | | | |
|---|---|---|---|
| 6,330,670 B1 * | 12/2001 | England et al. ................ 713/2 |
| 7,134,144 B2 * | 11/2006 | McKune ....................... 726/26 |
| 2002/0120465 A1 * | 8/2002 | Mori et al. ..................... 705/1 |
| 2003/0069854 A1 * | 4/2003 | Hsu et al. ...................... 705/59 |
| 2003/0163684 A1 * | 8/2003 | Fransdonk ................... 713/153 |
| 2003/0233553 A1 * | 12/2003 | Parks et al. .................. 713/178 |
| 2005/0044397 A1 * | 2/2005 | Bjorkengren ............... 713/200 |
| 2005/0204209 A1 * | 9/2005 | Vataja ......................... 714/701 |
| 2006/0248596 A1 * | 11/2006 | Jain et al. ...................... 726/27 |
| 2007/0258595 A1 * | 11/2007 | Choy .......................... 380/278 |

* cited by examiner

*Primary Examiner*—Thomas Lee
*Assistant Examiner*—Zahid Choudhury
(74) *Attorney, Agent, or Firm*—Robert D. Shedd; Harvey D. Fried; Joel M. Fogelson

(57) ABSTRACT

A method for implementing multiple clock interfaces in a single media player. The method and accompanying device are configured to utilize the preferred secure clock. If the remote host cannot support a secure clock, the method can alternately implement an anti-rollback clock interface. For each download session the clock data is separately maintained for subsequent access during playback of the corresponding content. The method supports secure digital rights management content downloads.

17 Claims, 2 Drawing Sheets

IMPLEMENTATION OF MULTIPLE CLOCK INTERFACES

FIELD OF THE INVENTION

The present principles relate to the implementation of a digital rights management solution using clocks to determine the expiration of media assets.

BACKGROUND OF THE INVENTION

Today, many multimedia devices implement a digital rights management (DRM) framework to allow customers to securely license and download music, movies, and other audio/visual content to such devices. Many multimedia devices support a DRM framework that uses a clock to determine when a multimedia asset expires for a multimedia device. For example, the DRM for a multimedia asset will have a video or music asset expire a week after it is downloaded to a device.

Various pay services are available to deliver content such as movies and music assets to devices such as set-top boxes and personal computers. Different modalities such as a broadcast signal or a network connection may be used to transmit such content to a device of a user. When content is received at the point of a device, such content may be affected by a DRM solution that causes the content to "expire" after a certain period of time. When the content expires, such content cannot be used unless a user updates the DRM license associated with the inactivated content. Such activation may occur via software or by a user calling into a service to request the activation of expired content.

Accordingly, one approach for determining when content expires (in view of a time limit) is to utilize a clock or multiple clocks that is used as a time reference. Such clocks however must be kept secure from tampering in order to properly enforce the DRM protection of an asset. One commonly implemented DRM solution (used by Microsoft) utilizes two clocks where one of the clocks is known as an anti-rollback clock. Such a clock is preset and monitored for tampering, wherein content that uses such a clock as a reference becomes invalidated if such the clock is tampered with. In order to regain access to the inactivated content, a user must obtain a new license to from a content provider or from the operator of a DRM solution to replace that invalidated license, if such invalidation was an accident. There are however significant time and cost concerns to getting a replacement license, because of the difficulty in using software to reset licenses or the element of transacting with an agent over the phone.

There are additional drawbacks to the use of an anti-rollback clock. The clock must be set to be specific time before information used to set such a clock is downloaded. Additionally, relying on a user to properly set the clock can be problematic, especially if the user is lacks a technical background in the use of software or the user sets a clock to the wrong time causing content to become invalidated.

To avoid these problems, some solutions (such as one advocated by Microsoft) recommends the usage of a secure clock where such a clock is set without user intervention and cannot be set by a user. Instead, the secure clock is set via a proxy server via a secured network connection which minimizes the possibility of outside tampering. That is, the connection will fail if the security of the connection is breached. During the connection with a secured clock, a device will then download information to set the internal clock of the device so that content may be used.

Many devices currently use either a secure clock or an anti-rollback clock for DRM solutions that have content that expires. Depending on the type of connection and method of downloading, a player would incorporate one clock system only. That is, if the source of the content is unable to provide a secure clock, the device was relegated to using an anti-rollback solution.

Accordingly, it would be desirable to provide a clock solution where the user is not required to set the clock on the device to match the host clock. Furthermore, it would be preferable to utilize a secure clock in cases where the content provides secure clock support. Finally, it would be desirable to provide multiple clock interfaces that operate transparently from the user's perspective.

SUMMARY OF THE INVENTION

According to one implementation, the short falls of the known art are overcome by providing a universal clock implementation solution that is transparent to the user, while expanding DRM download capabilities.

One embodiment includes a method for implementing multiple clock interfaces in a media device, with one step of configuring a device to default to a secure clock interface upon initiation of a DRM download from a host. An anti-rollback clock interface is implemented within the media player upon receiving a command from the host that a secure clock interface is not supported. The media device implements a secure clock interface in response to receiving an explicit proprietary command from the host prior to the DRM download.

The secure clock (SC) interface includes a SC store that is either a license store or a Device Certificate. During secure clock DRM downloads, the media player is locked to SC store until the player is disconnected from the host. The secure clock time is reset and maintained separately for each download in accordance with the limitations contained in the digital right management data corresponding to the download. The separately maintained secure clock time is selected upon playback of the corresponding download.

The media device implements an anti-rollback clock interface in response to receiving an explicit proprietary command from the host prior to the DRM download. The anti-rollback clock (AR) interface includes an AR store. During an anti-rollback clock DRM download, the media device is locked to the AR store until the player is disconnected from the host. The anti-rollback clock time is reset and maintained separately for each download in accordance with the limitations contained in the DRM data corresponding to the download. The separately maintained anti-rollback clock time is selected upon playback of the corresponding download.

The license store is split into a secure clock (SC) store and a separate anti-rollback (AR) store during downloading or updating process. When a playback command is received, the system determines a store priority by retrieving the license information from one of the SC store and the AR store that corresponds to the licensed stored during downloading.

In another embodiment, a media device for receiving DRM downloads with multiple clock interfaces from a host includes a media device capable of implementing one of a secure clock interface and an anti-rollback clock interface upon initiating a DRM download. The media device selectively implements one of the clock interfaces by separately resetting and maintaining the selected clock interface based on the DRM accompanying the download. The media device defaults to a secure clock interface. The player includes means for receiving an explicit proprietary command to recognize the host as supporting a secure clock interface.

The secure clock (SC) interface includes a SC store that is either a license store or a Device Certificate. During secure clock DRM downloads, the media device is locked to SC store until the device is disconnected from the host. The media device includes means for independently maintaining the source of the SC store content so that during playback of the download, the associated SC store can be selected.

The media device includes means for receiving an explicit proprietary command to recognize the host as being capable of utilizing an anti-rollback clock interface and switching to the anti-rollback clock interface in a user transparent manner. The anti-rollback (AR) interface includes an AR store. During anti-rollback clock DRM downloads, the media device is locked to AR store until the device is disconnected from the host. The media device includes means for independently maintaining the source of the AR store content so that during playback of the download, the associated AR store can be selected. The media device includes a means for determining a store priority so that during playback of the download one of the independently maintained sources of SC content or AR content is accessed.

Other aspects and features of the present principles will become apparent from the following detailed description considered in conjunction with the accompanying drawings. It is to be understood, however, that the drawings are designed solely for purposes of illustration and not as a definition of the limits of the present principles, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar components throughout the views.

DETAILED DESCRIPTION OF THE INVENTION

For the purposes of the present invention, the terms media asset and media content present any type of audio, video, or combination thereof that is capable of being distributed electronically. For example, a media asset may be television program that is capable of being transmitted over the air, downloaded from a server via a broadband connection, transmitted via cable or Digital Subscriber Line, through a wireless connection using a protocol such as 802.11a, b, g, or the like, or any other type of modality thereof. Media assets are to be things such a television shows, movies, music, radio assets, pictures, ringtones, video, and the like. Furthermore, the assets and content described in the present application may be encoded in various encoding formats such as MPEG-2, MPEG-4, JVT, VC-1, MP3, and the like.

Additionally, for purposes of the present invention, the term media device is any device or program capable of playing back media content and assets creating audio, video, or a combination thereof. Such devices may be a personal computer, a portable media device capable of displaying video or rendering audio, a video game console, a set top box, a device that runs media player software to render audio, video, or a combination thereof, and the like. Preferably, media devices interoperate with DRM software that controls the playback of protected content. It is noted that some content that is played back on a media device will not have DRM protection while other media content will. It is also envisioned that different media content on the same device will utilize different DRM solutions.

Figure 1:
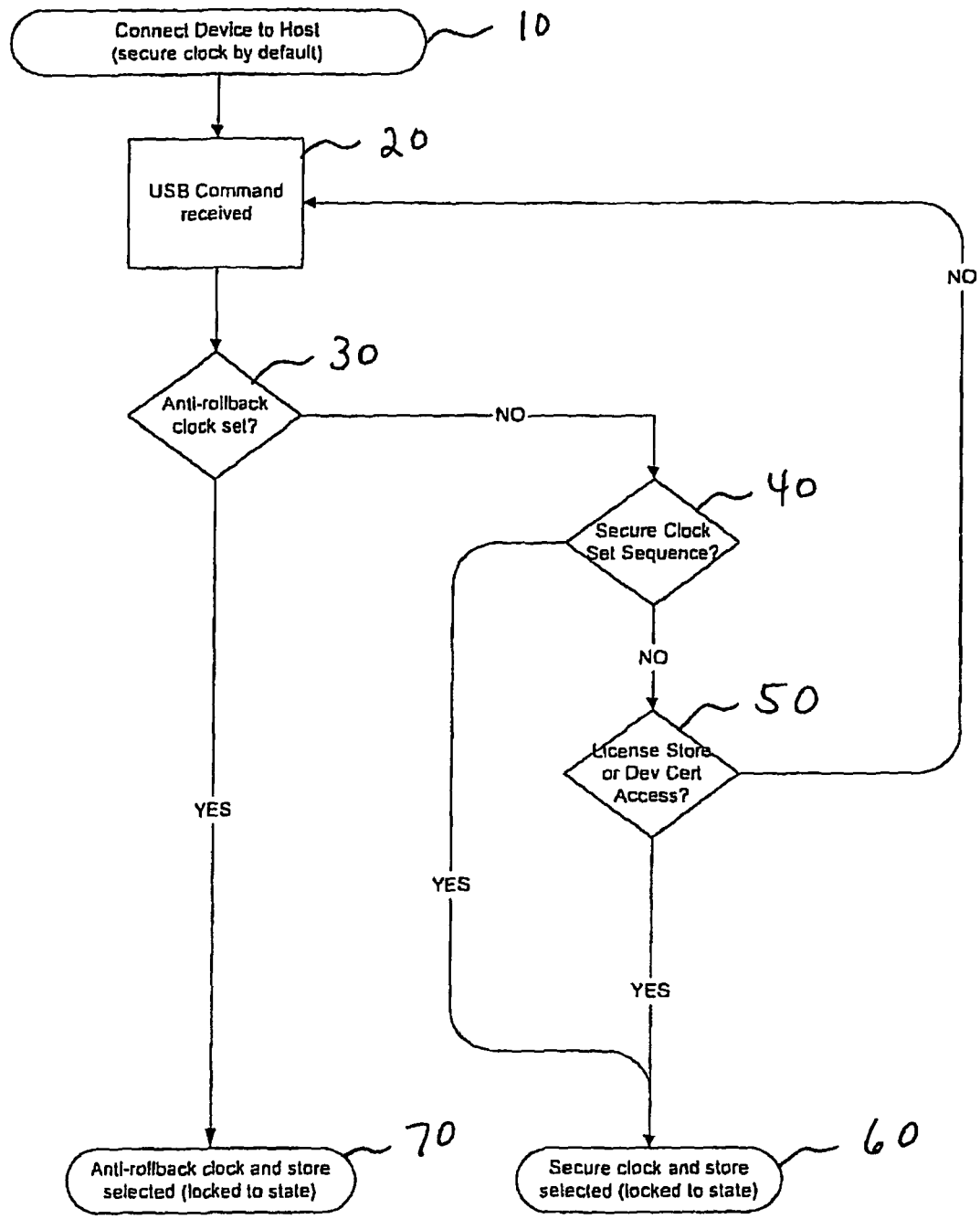
FIG. 1 is a flowchart illustrating various steps performed during clock implementation.

In accordance with an embodiment of the present principles, FIG. 1 is a flowchart illustrating various steps performed according an embodiment of the present invention. In step 10 a media device is connected to a host to download media content. The content may include a Digital Rights Management (DRM) framework to allow a user to securely license and download music, movies or other audio/visual media content. The invention may be utilized with Microsoft DRM, as well in view with other DRM solutions. One key to the invention is the implementation of the clock that is used by the DRM to determine when media content should expire.

Step 10 indicates that the secure clock is set by default. The system ignores step 20 at this stage, and in step 30 will receive a NO, thereby arriving at step 40 (i.e. the secure clock default selection). In order to start the sequence it is necessary to first receive an explicit proprietary command from the host. The host is queried in step 50 by initiating license store or development certificate access. In response, a host that is secure clock enabled sends the explicit proprietary command which is received by the device in step 20. Proceeding through step 30, the secure clock sequence is now set, YES, and the process can advance to step 60. The device is now locked to state until it is disconnected from the host. In other words, access to a Secure Clock (SC) store is provided for the download session. The SC store may include a license store or a device certificate store.

The secure clock time is reset and maintained separately and in accordance with the limitations expressed in the DRM agreements. For playback, the source of the content is maintained so that the correct license store can be selected. The secure clock is used to determine the expiration of the media lease period. Thereafter the download can no longer be played.

Certain host connections to the device cannot provide a secure clock. For example, a set-top box without a connection to the internet. When such a device is connected to the host in step 10, the process passes through steps 20, 30 and 40 to step 50. The host is queried in step 50 by initiating license store or development certificate access. In response, a host that is not secure clock enabled sends an alternate explicit proprietary command for an anti-rollback clock, which is received in step 20. Now in step 30 the result is YES, and the process proceeds to step 70. The device is now locked to state until it is disconnected from the host. In other words, access to an anti-rollback (AR) store is provided for the download session. The AR store may include a license store.

In summary, the process for each newly initiated download session proceeds generally to step 50. The host is then responsible for sending an explicit proprietary signal for either a secure clock or an anti-rollback clock. Steps 30 and 40 will then respond as gates, directing the process to either step 70 or step 60.

Figure 2:
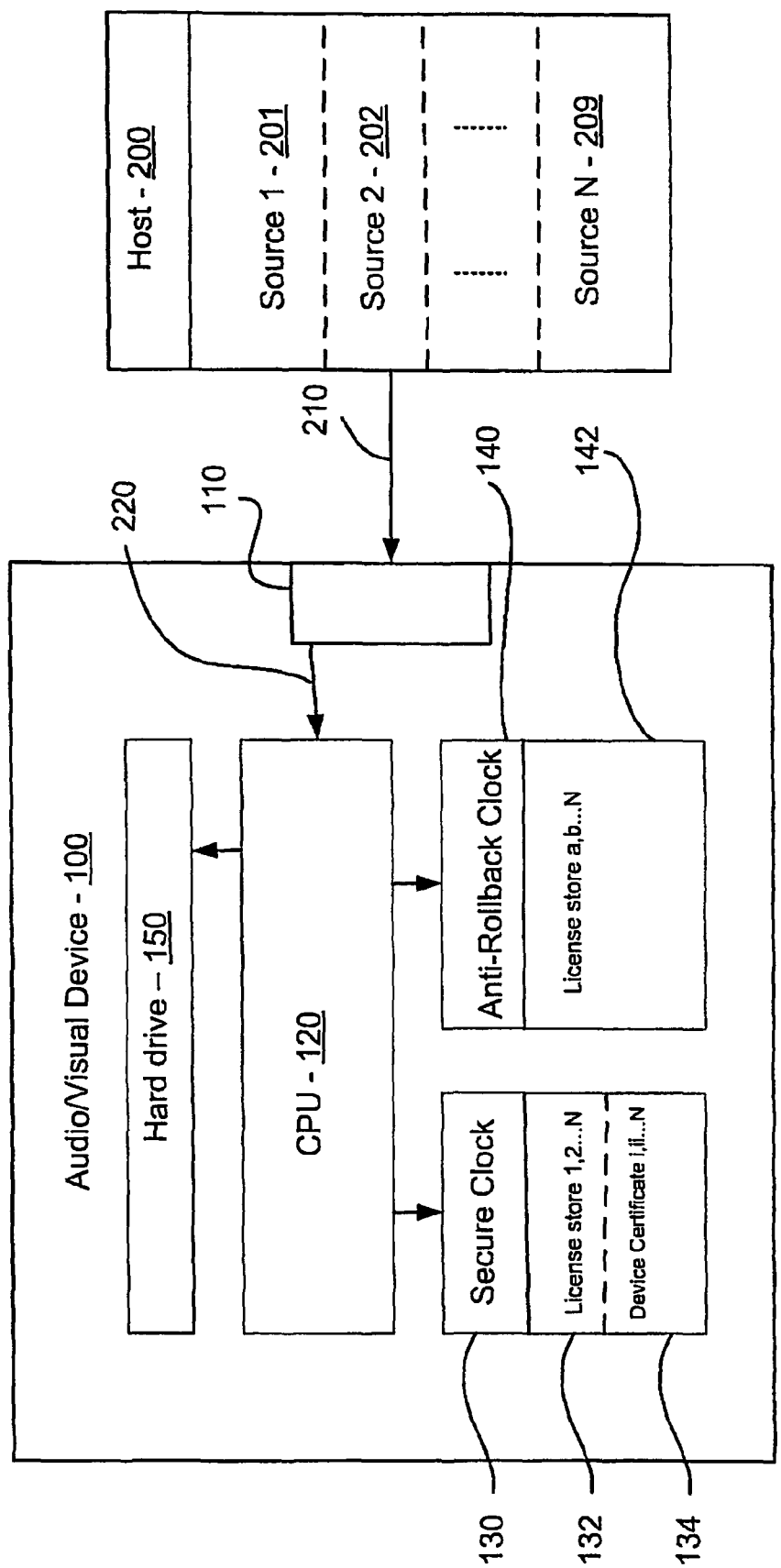
FIG. 2 is a schematic diagram illustrating various modules within an audio/visual device.

Referring to FIG. 2, there is shown a schematic diagram of an audio/video device (media device) 100. In the context of this invention, media device 100 is capable of storing and playing media that is downloaded from a host. A non-limiting example of one of these types of devices is an RCA X3030 PMP. In addition to storing the media on a hard drive 150 or other memory device, the player must support a digital rights management framework (DRM), for example, Microsoft DRM (MSDRM). Provided with device 100 is a method of implementing both a secure clock interface, and when such is not available, having the capability to alternately implement an anti-rollback clock interface in a user transparent manner (that prevents the user from noticing which interface is being used).

Device 100 is able to communicate with a host 200. Host 200 may be a remote server accessible via the internet. Such a remote server may have a local PC serving as a proxy on the internet connection. Another example of a host is a set-top box that receives data over a cable or via a satellite. A variety of factors like the connection type and host configuration, determine whether the preferred secure clock can be used to monitor expiration of leased download content. If the secure clock is not supported, the invention allows seamless adoption of the anti-rollback clock implementation.

Device 100 includes an input port 110 for connection to host 200, or to the local host. The input port may include wireless or hard-wired connections. In a practical embodiment of the invention, a USB port was tested. For example, the PC or set top box uses a USB cable to transmit data along connection 210 to a USB input port 110 on the device. As described in FIG. 1, the host is required to send one of two explicit proprietary commands, which is represented on FIG. 2 as signal 220. CPU 120 process the command signal, and decision blocks 30 or 40 within the CPU determine if the default secure clock 130 will be implemented or the alternate anti-rollback clock 140.

According to step 60, the CPU will be store either a license in license store 132, or it will store a device certificate in location 134. According to step 70, the CPU will store a license in license store 142. Device 100 will be locked to state, and the download can proceed with the content utilizing connection 210 and port 110 to stream or trickle the content to the device's hard drive 150.

Device 100 includes the ability to split the license store into two pieces. When new content is downloaded, the device will recognize if the host is able to provide a secure clock setting. In cases where the clock is not secure, the anti-rollback license store (142) will be used. In other cases, the secure license store (132) is used. Information is maintained separately to determine a store priority for retrieving the license information for playback. That is, when CPU receives a command for playback it retrieves the content's administrative data, including the source of the content, from hard drive 150. Once the source is known, CPU can query the related store from locations 132, 134 or 142, to dentine if the content is still authorized for use, or has expired.

For example, consider a first download from a first source 201 that supports a secure clock. License store 132 may be selected, in which case the secure clock is reset and maintained separately at location 132, in accordance with the terms of the DRM. Subsequently a second download from a second source 202, may require a device certificate, in which case the location 134 is used. Another download may only support the anti-rollback clock, in which case the anti-rollback clock is reset and maintained separately at location 142, in accordance with the terms of the DRM. The representation of host 200 indicates that any number of different sources may be accessed. Each location 132, 134 and 142 is able to separately store the clock data for that session, and make it available upon playback.

By requiring an explicit, proprietary command from host 200, device 100 can automatically facilitate a clock implementation in a manner that is transparent to the user, and which improves the user's experience. It can be seen that several advantages flow from the methods and devices disclosed herein. The user is no longer responsible to set the clock on the device to match the host clock. This eliminates consumer confusion and problems with playback. Content that requires a secure clock is always supported. Since most content is transmitted from an internet source via a PC, the secure clock can be used implemented transparently by the large majority of users.

It is to be understood that the present principles may be implemented in various forms of hardware, software, firmware, special purpose processors, or a combination thereof. Preferably, the present principles may be implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present principles is programmed. Given the teachings herein, one of ordinary skill in the related art will be able to contemplate these and similar implementations or configurations of the present principles.

While there have been shown, described and pointed out fundamental novel features of the present principles, it will be understood that various omissions, substitutions and changes in the form and details of the methods described and devices illustrated, and in their operation, may be made by those skilled in the art without departing from the spirit of the same. For example, it is expressly intended that all combinations of those elements and/or method steps which perform substantially the same function in substantially the same way to achieve the same results are within the scope of the present principles. Moreover, it should be recognized that structures and/or elements and/or method steps shown and/or described in connection with any disclosed form or implementation of the present principles may be incorporated in any other disclosed, described or suggested form or implementation as a general matter of design choice. It is the intention, therefore, to be limited only as indicated by the scope of the claims appended hereto.

What is claimed is:

1. A method for implementing multiple clock interfaces in a device comprising the steps of:
   configuring a device to a default to a first clock interface upon receipt of media content, the first clock interface is implemented as a secure clock (SC) interface and includes a SC store selected from a group consisting of a license store and a device certificate; and
   implementing a second clock interface within the device upon a determination that the first clock interface is not supported; the second clock interface is implemented as an anti-rollback clock interface in response to an external command before receipt of the media content.

2. The method of claim 1, wherein the device implements the first clock interface as the secure clock interface in response to receiving an explicit proprietary command from a host prior to the download of media content using a Digital Rights Management (DRM) solution.

3. The method of claim 2, wherein during a secure clock download, the device is locked to the SC store until the device is disconnected from a host.

4. The method of claim 1, wherein the time of said secure clock interface is reset and maintained separately upon a second receipt of media content.

5. The method of claim 4, further comprising selecting the separately maintained secure clock time upon playback of selected media content.

6. The method of claim 1, wherein the anti-rollback clock (AR) interface includes an AR store; wherein during the downloading of information related to said anti-rollback clock, said player is locked to AR store until said player is disconnected from a host.

7. The method of claim 6, wherein the anti-rollback clock time is reset and maintained separately for a second receipt of content in accordance with the limitations contained in digital rights management data corresponding to the second receipt of said content.

8. The method of claim 7, further comprising selecting the separately maintained anti-rollback clock time upon playback of the corresponding download.

9. The method of claim 1, comprising:
splitting the license store into the secure clock (SC) store and the separate anti-rollback (AR) store corresponding to said second clock interface during the receipt of content;
determining a store priority by retrieving the license information from one of the SC store and the AR store that corresponds to the license stored during receipt of content when said content is played back.

10. A device for receiving content where said device uses multiple clock interfaces:
a media device capable of implementing one of a first clock interface and a second clock interface upon the receipt of content;
wherein said device selectively implements one of said clock interfaces by separately resetting and maintaining the selected clock interface based on a digital rights management scheme accompanying a download;
wherein said first clock interface is implemented as a secure clock (SC) interface and includes a SC store selected from a group consisting of a license store and a device certificate; and P1 said second clock interface is implemented as an anti-rollback clock interface in response to said device receiving an external command before receipt of the content.

11. The device of claim 10, wherein said device defaults to a said secure clock interface for said first clock interface.

12. The device of claim 11, wherein said device includes means for receiving an explicit proprietary command to recognize a host as supporting the secure clock interface.

13. The device of claim 10, wherein during secure clock DRM downloads, said media device is locked to said SC store until said device is disconnected from a host.

14. The device of claim 13, wherein said device includes means for maintaining the source of the SC store content so that during playback of content, the SC store associated with said content can be selected.

15. The device of claim 14, wherein said anti-rollback (AR) interface includes an AR store; wherein during anti-rollback clock DRM downloads, said device is locked to said AR store until said device is disconnected from a host.

16. The device of claim 15, wherein said audio/visual player includes means for maintaining the source of the AR store content so that during playback of content the associated AR store to said content is selected.

17. The device of claim 16, wherein said audio/visual player includes means for determining a store priority so that during playback content at least one of a SC content store or an AR content store is accessed.

* * * * *